(12) United States Patent
Oh et al.

(10) Patent No.: US 11,726,706 B2
(45) Date of Patent: Aug. 15, 2023

(54) STORAGE DEVICE AND METHOD OF OPERATING THE SAME

(71) Applicant: SK hynix Inc., Icheon (KR)

(72) Inventors: Tae Jin Oh, Icheon (KR); Jung Ki Noh, Icheon (KR); Soon Yeal Yang, Icheon (KR)

(73) Assignee: SK HYNIX INC., Icheon (KR)

( * ) Notice: Subject to any disclaimer, the term of this patent is extended or adjusted under 35 U.S.C. 154(b) by 167 days.

(21) Appl. No.: 17/172,945

(22) Filed: Feb. 10, 2021

(65) Prior Publication Data

US 2022/0050626 A1  Feb. 17, 2022

(30) Foreign Application Priority Data

Aug. 14, 2020  (KR) .................... 10-2020-0102788

(51) Int. Cl.
*G06F 12/00* (2006.01)
*G06F 3/06* (2006.01)

(52) U.S. Cl.
CPC .......... *G06F 3/0656* (2013.01); *G06F 3/0611* (2013.01); *G06F 3/0653* (2013.01); *G06F 3/0679* (2013.01)

(58) Field of Classification Search
CPC .... G06F 3/0656; G06F 3/0611; G06F 3/0653; G06F 3/0679
See application file for complete search history.

(56) References Cited

U.S. PATENT DOCUMENTS

| 10,528,469 | B2 * | 1/2020 | Koo ................... | G06F 12/0246 |
| 2011/0102636 | A1 * | 5/2011 | Kamphenkel ....... | G06F 12/0246 365/185.03 |
| 2011/0252187 | A1 * | 10/2011 | Segal ................. | G06F 12/0246 711/E12.008 |
| 2012/0260149 | A1 * | 10/2012 | Chang ................ | H03M 13/13 714/763 |
| 2013/0027802 | A1 * | 1/2013 | Kim .................... | G06F 3/064 |
| 2013/0067144 | A1 * | 3/2013 | Namba ............... | G06F 3/065 711/E12.001 |
| 2015/0253990 | A1 * | 9/2015 | Yen .................... | G06F 3/0679 711/103 |

(Continued)

FOREIGN PATENT DOCUMENTS

KR  101083673 B1  11/2011
KR  20180047402 A  5/2018

*Primary Examiner* — David Yi
*Assistant Examiner* — Tahilba O Puche

(57) ABSTRACT

A storage device includes a memory device including a plurality of sequential areas and a random area other than the plurality of sequential areas, the plurality of sequential areas storing pieces of data corresponding to consecutive logical addresses input from a host, a buffer memory device configured to temporarily store write data corresponding to a write request provided from the host and an operation controller configured to generate combined data by adding dummy data to the write data having a size less than a program unit size of the memory device, a size of the dummy data corresponding to a difference between the size of the write data and the program unit size, store the combined data in the memory device, and store combined data information, relating to the combined data stored in the memory device, in the buffer memory device.

20 Claims, 17 Drawing Sheets

(56) References Cited

U.S. PATENT DOCUMENTS

| | | | |
|---|---|---|---|
| 2016/0132387 A1* | 5/2016 | Yeh | G11C 29/52 |
| | | | 714/766 |
| 2017/0070241 A1* | 3/2017 | Kaku | H03M 13/2906 |
| 2018/0067691 A1* | 3/2018 | Zhou | G06F 3/0619 |
| 2018/0143899 A1* | 5/2018 | Park | G06F 12/0246 |
| 2018/0293007 A1* | 10/2018 | Jeong | G06F 3/064 |
| 2019/0066791 A1* | 2/2019 | Papa | G06F 11/079 |
| 2019/0114255 A1* | 4/2019 | Jain | G06F 3/068 |
| 2020/0073595 A1* | 3/2020 | Ou | G06F 3/0611 |

\* cited by examiner

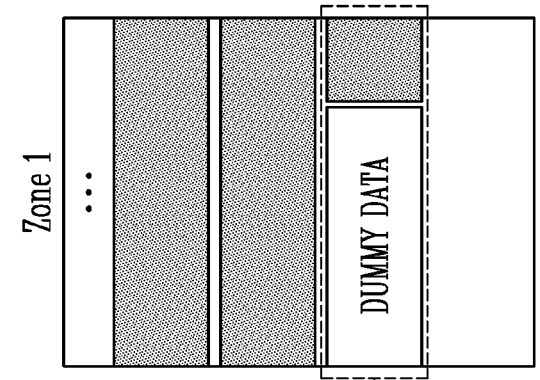

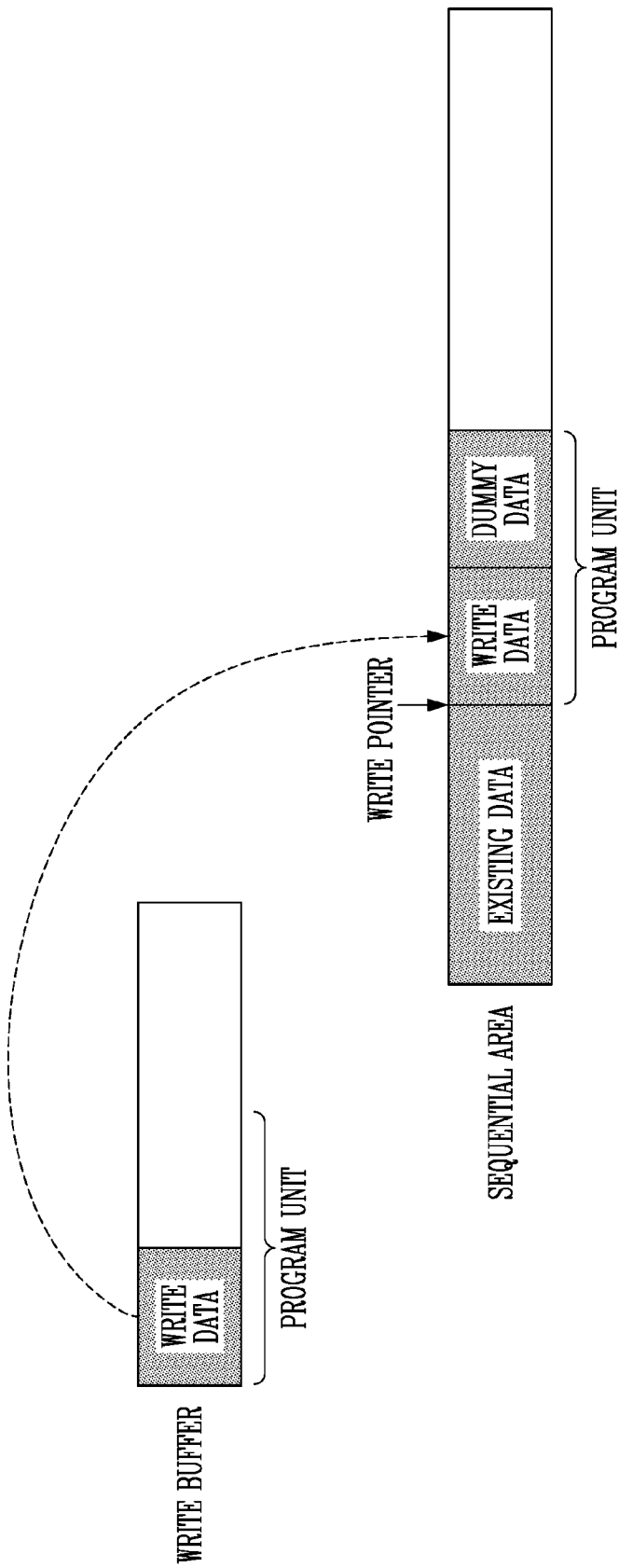

FIG. 12A

SEQUENTIAL MAPPING TABLE(223a)

| LBA | PBA |
|---|---|
| LBA1~6 | PBA1~PBA6 |
| LBA7~8 | PBA7~8 |
| LBA9~12 | PBA9~12 |
| LBA13 | Write Pointer |

RANDOM MAPPING TABLE(223b)

| LBA | PBA |
|---|---|
| LBA7 | PBA21 |
| LBA8 | PBA22 |

⋮

COMBINED DATA INFORMATION(223c)

| Zone # | Dummy Data Start LBA | Length |
|--------|---------------------|--------|
| Zone1  | LBA7                | 2      |
| Zone2  | LBA5                | 3      |

⋮

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0102788, filed on Aug. 14, 2020, in the Korean Intellectual Property Office, the entire disclosure of which is incorporated herein by reference.

BACKGROUND

1. Technical Field

Various embodiments of the present disclosure generally relate to an electronic device, and more particularly, to a storage device and a method of operating the storage device.

2. Related Art

A storage device is a device which stores data under the control of a host device such as a computer or a smartphone. The storage device may include a memory device in which data is stored and a memory controller which controls the memory device. Memory devices may be classified into a volatile memory device and a nonvolatile memory device.

The volatile memory device may be a memory device in which data is stored only when power is supplied thereto and in which stored data is lost when the supply of power is interrupted. Examples of the volatile memory device may include a static random access memory (SRAM), a dynamic random access memory (DRAM), and the like.

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), a flash memory, and the like.

SUMMARY

Various embodiments of the present disclosure are directed to a storage device having improved storage performance and a method of operating the storage device.

An embodiment of the present disclosure may provide for a storage device. The storage device may include a memory device including a plurality of sequential areas and a random area other than the plurality of sequential areas, the plurality of sequential areas storing pieces of data corresponding to consecutive logical addresses input from a host, a buffer memory device configured to temporarily store write data corresponding to a write request provided from the host and an operation controller configured to generate combined data by adding dummy data to the write data having a size less than a program unit size of the memory device, a size of the dummy data corresponding to a difference between the size of the write data and the program unit size, store the combined data in the memory device, and store combined data information, relating to the combined data stored in the memory device, in the buffer memory device.

An embodiment of the present disclosure may provide for a storage device. The storage device may include a memory device including a plurality of sequential areas and a random area other than the plurality of sequential areas, the plurality of sequential areas storing pieces of data corresponding to consecutive logical addresses input from a host and a memory controller configured to receive a write request from the host and control the memory device so that a part of write data corresponding to the write request is stored in the random area depending on whether dummy data has been stored in a sequential area, corresponding to a logical address included in the write request, among the plurality of sequential areas.

An embodiment of the present disclosure may provide for a storage device. The storage device may include a memory device including a plurality of sequential areas and a random area other than the plurality of sequential areas, the plurality of sequential areas storing pieces of data corresponding to consecutive logical addresses input from a host, a buffer memory device configured to store a sequential mapping table including information about logical addresses of the pieces of data respectively stored in the plurality of sequential areas, a random mapping table including information about a logical address of data stored in the random area, and combined data information including information about dummy data stored in the plurality of sequential areas and a memory controller configured to acquire read data, corresponding to a read request input from the host, from at least one of the random area and a sequential area corresponding to a logical address included in the read request among the plurality of sequential areas, depending on whether the logical address included in the read request is included in the combined data information, and to provide the read data to the host.

BRIEF DESCRIPTION OF THE DRAWINGS

FIG. 8A illustrates a state in which write data having a size less than a program unit size is temporarily stored in a write buffer.

FIG. 8B illustrates a state in which combined data, in which dummy data corresponding to a difference between the program unit size and a size of write data is added to the write data, is generated.

FIG. 8C shows a state in which the combined data is stored in a first sequential area.

FIG. 8D illustrates a position of a write pointer after the combined data has been stored in the first sequential area.

FIGS. 9A and 9B are diagrams illustrating an operation of the storage device of FIG. 1 according to an embodiment of the present disclosure.

FIGS. 12A to 12C are diagrams for explaining data stored in a mapping information storage of FIG. 7.

FIG. 13 is a diagram illustrating a memory controller of FIG. 1 according to an embodiment of the present disclosure.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
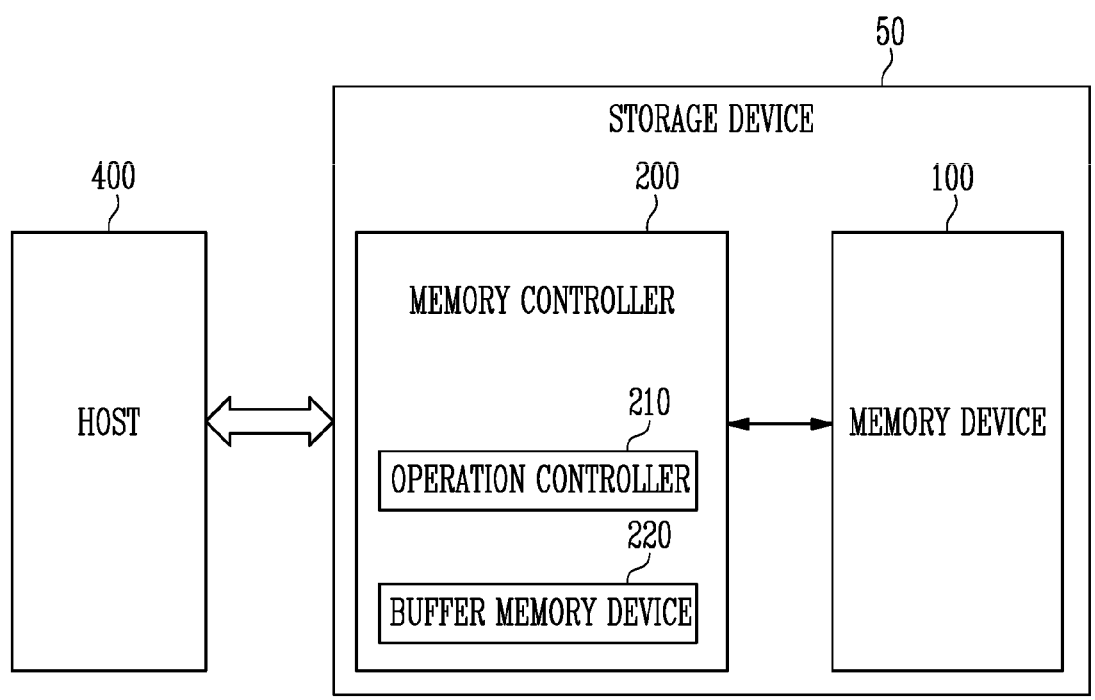
FIG. 1 is a diagram illustrating a storage device according to an embodiment of the present disclosure.

FIG. 1 is a diagram illustrating a storage device 50 according to an embodiment of the present disclosure.

Referring to FIG. 1, the storage device 50 may include a memory device 100 and a memory controller 200 which controls an operation of the memory device 100. The storage device 50 may store data under the control of a host 400, such as a mobile phone, a smartphone, an MP3 player, a laptop computer, a desktop computer, a game console, a TV, a tablet PC, an in-vehicle infotainment system, or the like.

The storage device 50 may be manufactured as any one of various types of storage devices depending on a host interface which is a scheme for communication with the host 400. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, a memory stick, and so on.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), wafer-level stack package (WSP), and so on.

The memory device 100 may store data. The memory device 100 operates in response to the control of the memory controller 200. The memory device 100 may include a memory cell array (not illustrated) including a plurality of memory cells which store data.

Each of the memory cells may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data.

The memory cell array (not illustrated) may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), a spin transfer torque RAM (STT-RAM), or the like. In the present specification, for convenience of description, a description will be made on the assumption that the memory device 100 is a NAND flash memory.

The memory device 100 may receive a command and an address from the memory controller 200, and may access an area of the memory cell array, selected by the address. The memory device 100 may perform an operation indicated by the command on the area selected by the address. For example, the memory device 100 may perform a write operation (i.e., a program operation), a read operation, and an erase operation. During a program operation, the memory device 100 may program data to the area selected by the address. During a read operation, the memory device 100 may sense data from the area selected by the address. During an erase operation, the memory device 100 may erase data stored in the area selected by the address.

The memory controller 200 may control the overall operation of the storage device 50.

When power is supplied to the storage device 50, the memory controller 200 may run firmware (FW). When the memory device 100 is a flash memory device, the firmware (FW) may include a host interface layer (HIL) which controls communication with the host 400, a flash translation layer (FTL) which controls communication between the host 400 and the memory device 100, and a flash interface layer (FIL) which controls communication with the memory device 100.

In an embodiment, the memory controller 200 may receive write data and a logical block address (LBA) from the host 400, and may translate the logical block address (LBA) into a physical block address (PBA) indicating an address of memory cells included in the memory device 100, the write data being to be stored in the memory cells. In the present specification, the terms "logical block address (LBA)" and "logical address" may be used interchangeably. In the present specification, the terms "physical block address (PBA)" and "physical address" may be used interchangeably.

The memory controller 200 may control the memory device 100 so that a program operation, a read operation or an erase operation is performed in the memory device 100 in response to a request received from the host 400. During a program operation, the memory controller 200 may provide a write command, a physical block address (PBA), and write data to the memory device 100. During a read opera-tion, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may autonomously generate a command, an address, and data regardless of whether a request from the host 400 is received, and may transmit them to the memory device 100. For example, the memory controller 200 may provide the memory device 100 with commands, addresses, and data required in order to perform read operations and program operations that are involved in performing wear leveling, read reclaim, garbage collection, etc.

In an embodiment, the memory controller 200 may control at least two memory devices 100. In this case, the memory controller 200 may control the at least two memory devices 100 according to an interleaving scheme to improve operating performance. The interleaving scheme may be a scheme for controlling the at least two memory devices 100 so that operations of the at least two memory devices 100 are caused to overlap each other.

In an embodiment of the present disclosure, the memory controller 200 may include an operation controller 210 and a buffer memory device 220.

The operation controller 210 may process a write request and a read request provided from the host 400.

The buffer memory device 220 may temporarily store write data corresponding to the write request provided from the host 400. Alternatively, the buffer memory device 220 may temporarily store data read from the memory device 100 in response to the read request provided from the host 400.

In accordance with an embodiment of the present disclosure, the memory device 100 may include a plurality of sequential areas and a random area. The plurality of sequential areas are storage areas which store pieces of data corresponding to consecutive logical addresses input from the host 400, and the random area is a storage area other than the plurality of sequential areas. In an embodiment, the random area may be an area which stores pieces of data corresponding to non-consecutive logical addresses.

The plurality of sequential areas may store pieces of data of logical address groups respectively corresponding thereto. Here, each of the logical address groups may include consecutive logical addresses.

Each sequential area may be referred to as a "zone". Each sequential area may have an open state or a closed state depending on a request received from the host 400.

For example, in response to an open zone request provided from the host 400, the operation controller 210 may open a corresponding sequential area. Opening a sequential area may mean that a mapping table for a logical address group corresponding to the sequential area is generated.

In response to a closed zone request provided from the host 400, the operation controller 210 may change the open state of the corresponding sequential area to a closed state. The close zone request may be a request indicating that a write request to store data in the corresponding sequential area will not be input until an open zone request for the corresponding sequential area is input again.

In an embodiment, the buffer memory device 220 may store a sequential mapping table including mapping information of the plurality of sequential areas. The sequential mapping table may include write pointer position information indicating a position of a logical address of data to be currently stored, among logical addresses of pieces of data to be stored in respective sequential areas. That is, a logical address in a write request provided from the host 400 may be a logical address indicated by a write pointer position of a sequential area to which the corresponding logical address belongs. A write request may include logical addresses of write data and information about a length of the logical addresses of the write data. After processing the write request, the operation controller 210 may change the write pointer position information to information corresponding to a write pointer position determined by adding the length of the logical addresses to a previous write pointer position. Therefore, the write pointer position information may be synchronized with a start logical address among the logical addresses of the write data provided from the host 400.

In an embodiment, in response to a reset zone request provided from the host 400, the operation controller 210 may change the write pointer position information of the sequential area to a start logical address among logical addresses corresponding to the sequential area.

The operation controller 210 may control the buffer memory device 220 and the memory device 100 so that write data corresponding to a write request provided from the host 400 is stored in the memory device 100. The operation controller 210 may provide the memory device 100 with the write data in a size of a program unit of the memory device 100. The program unit size may be a size of write data that can be stored in the memory device 100 by performing one program operation.

When a size of write data stored in the buffer memory device 220 is less than the program unit size, the operation controller 210 may not provide the write data to the memory device 100. When the size of write data stored in the buffer memory device 220 reaches the program unit size, the operation controller 210 may provide the write data to the memory device 100.

In the state in which the write data having a size less than the program unit size is stored in the buffer memory device 220, the operation controller 210 may receive, from the host 400, a flush request to provide the write data stored in the buffer memory device 220 to the memory device 100. In this case, there may occur a situation in which the write data having the size less than the program unit size should be stored in a sequential area of the memory device 100.

Alternatively, in the state in which the write data having the size less than the program unit size is stored in the buffer memory device 220, a closed zone request for a corresponding sequential area may be input from the host 400. In this case, there may occur a situation in which the write data having the size less than the program unit size should be stored in the corresponding sequential area.

Alternatively, in the state in which the write data having the size less than the program unit size is stored in the buffer memory device 220, the storage device 50 may enter a low-power mode. In this case, there may occur a situation in which the write data having the size less than the program unit size should be stored in a sequential area of the memory device 100.

When the size of the write data stored in the buffer memory device 220 is less than the program unit size of the memory device 100, the operation controller 210 may generate combined data by adding dummy data to the write data, a size of the dummy data corresponding to a difference between the size of the write data and the program unit size. The operation controller 210 may then control the buffer memory device 220 and the memory device 100 so that the combined data is stored in the memory device 100. In this case, a position of a write pointer recognized by the host 400 may differ from a position of an actual write pointer.

Further, as a situation in which combined data is stored in a sequential area occurs more frequently, an actual data storage space of sequential areas in the memory device 100 may be reduced, thus deteriorating the overall performance of the storage device 50.

An embodiment of the present disclosure provides a method of, when combined data is stored in a sequential area, storing a part of write data subsequently provided from the host 400 in a random area in the memory device 100, thus preventing the performance of the storage device 50 from being deteriorated.

The host 400 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), Load Reduced DIMM (LRDIMM) communication methods, and so on.

Figure 2:
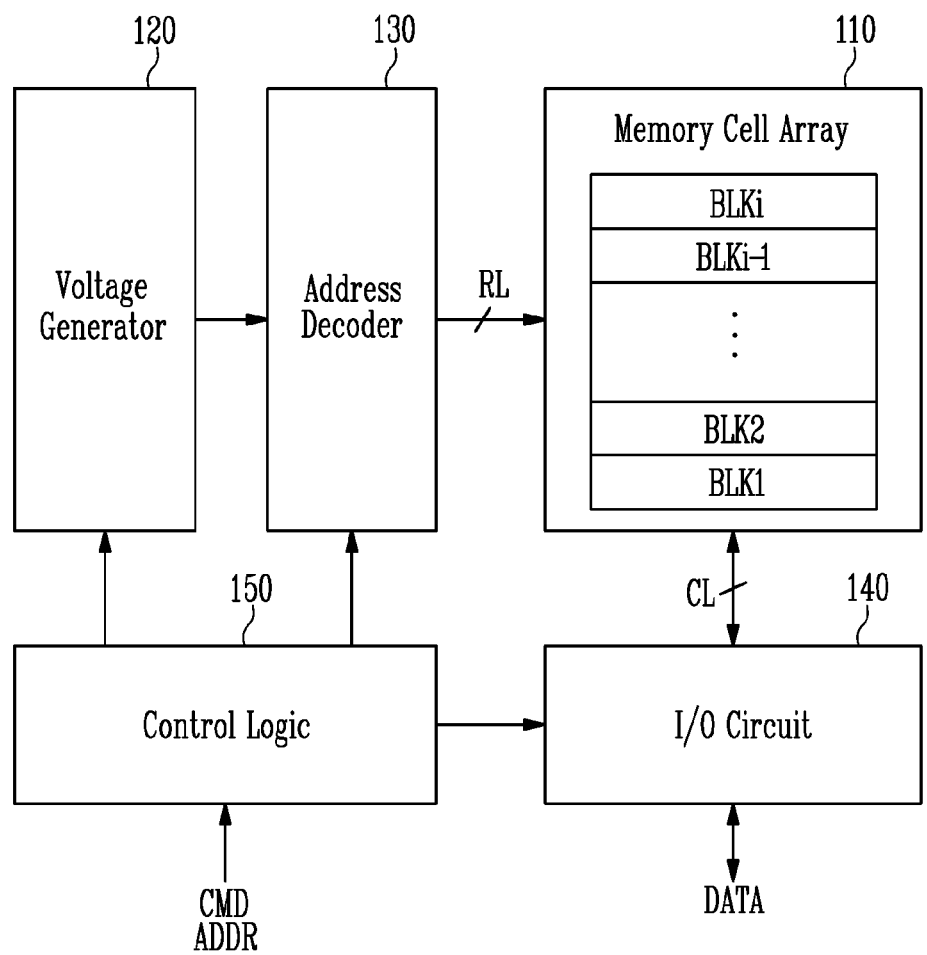
FIG. 2 is a diagram illustrating a memory device of FIG. 1.

FIG. 2 is a diagram illustrating the memory device 100 of FIG. 1.

Referring to FIG. 2, the memory device 100 may include a memory cell array 110, a voltage generator 120, an address decoder 130, an input/output (I/O) circuit 140, and a control logic 150.

The memory cell array 110 includes a plurality of memory blocks BLK1 to BLKi. The plurality of memory blocks BLK1 to BLKi may be coupled to the address decoder 130 through row lines RL. The plurality of memory blocks BLK1 to BLKi may be coupled to the input/output circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 110 may include a plurality of physical pages. Each of the memory cells of the memory device 100 may be implemented as a single-level cell (SLC), a multi-level cell (MLC), a triple-level cell (TLC), or a quad-level cell (QLC).

In an embodiment, the voltage generator 120, the address decoder 130, and the input/output circuit 140 may be collectively designated as a peripheral circuit. The peripheral circuit may drive the memory cell array 110 under the control of the control logic 150. The peripheral circuit may drive the memory cell array 110 so as to perform a program operation, a read operation, and an erase operation.

The voltage generator 120 may generate a plurality of operating voltages using an external supply voltage that is supplied to the memory device 100. The voltage generator 120 may operate under the control of the control logic 150.

In an embodiment, the voltage generator 120 may generate an internal supply voltage by regulating the external supply voltage. The internal supply voltage generated by the voltage generator 120 is used as an operating voltage for the memory device 100.

In an embodiment, the voltage generator 120 may generate the plurality of operating voltages using the external supply voltage or the internal supply voltage. The voltage generator 120 may generate various voltages required by the memory device 100. For example, the voltage generator 120 may generate a plurality of erase voltages, a plurality of program voltages, a plurality of pass voltages, a plurality of select read voltages, and a plurality of unselect read voltages.

The voltage generator 120 may include a plurality of pumping capacitors for receiving the internal supply voltage so as to generate the plurality of operating voltages having various voltage levels, and may generate the plurality of operating voltages by selectively enabling the plurality of pumping capacitors under the control of the control logic 150.

The generated operating voltages may be supplied to the memory cell array 110 by the address decoder 130.

The address decoder 130 is coupled to the memory cell array 110 through the row lines RL. The address decoder 130 may operate under the control of the control logic 150. The address decoder 130 receives addresses ADDR from the control logic 150. The address decoder 130 may decode a block address among the received addresses ADDR. The address decoder 130 may select at least one of the memory blocks BLK1 to BLKi according to the decoded block address. The address decoder 130 may decode a row address among the received addresses ADDR. The address decoder 130 may select at least one of word lines of the selected memory block according to the decoded row address. In an embodiment, the address decoder 130 may decode a column address among the received addresses ADDR. The address decoder 130 may couple the input/output circuit 140 to the memory cell array 110 according to the decoded column address.

In accordance with an embodiment of the present disclosure, during a read operation, the address decoder 130 may apply a read voltage to a selected word line and apply a read pass voltage to unselected word lines, the read pass voltage having a level higher than that of the read voltage.

In an embodiment, the address decoder 130 may include components such as a row decoder, a column decoder, and an address buffer.

The input/output (I/O) circuit 140 may include a plurality of page buffers. The plurality of page buffers may be coupled to the memory cell array 110 through the bit lines. During a program operation, data may be stored in selected memory cells based on write data stored in the plurality of page buffers.

During the read operation, data stored in the selected memory cells may be sensed through bit lines, and the sensed data may be stored in the page buffers.

The control logic 150 may control the address decoder 130, the voltage generator 120, and the input/output circuit 140. The control logic 150 may operate in response to a command CMD transferred from an external device. The control logic 150 may control the peripheral circuit by generating various types of signals in response to the command CMD and the addresses ADDR.

Figure 3:
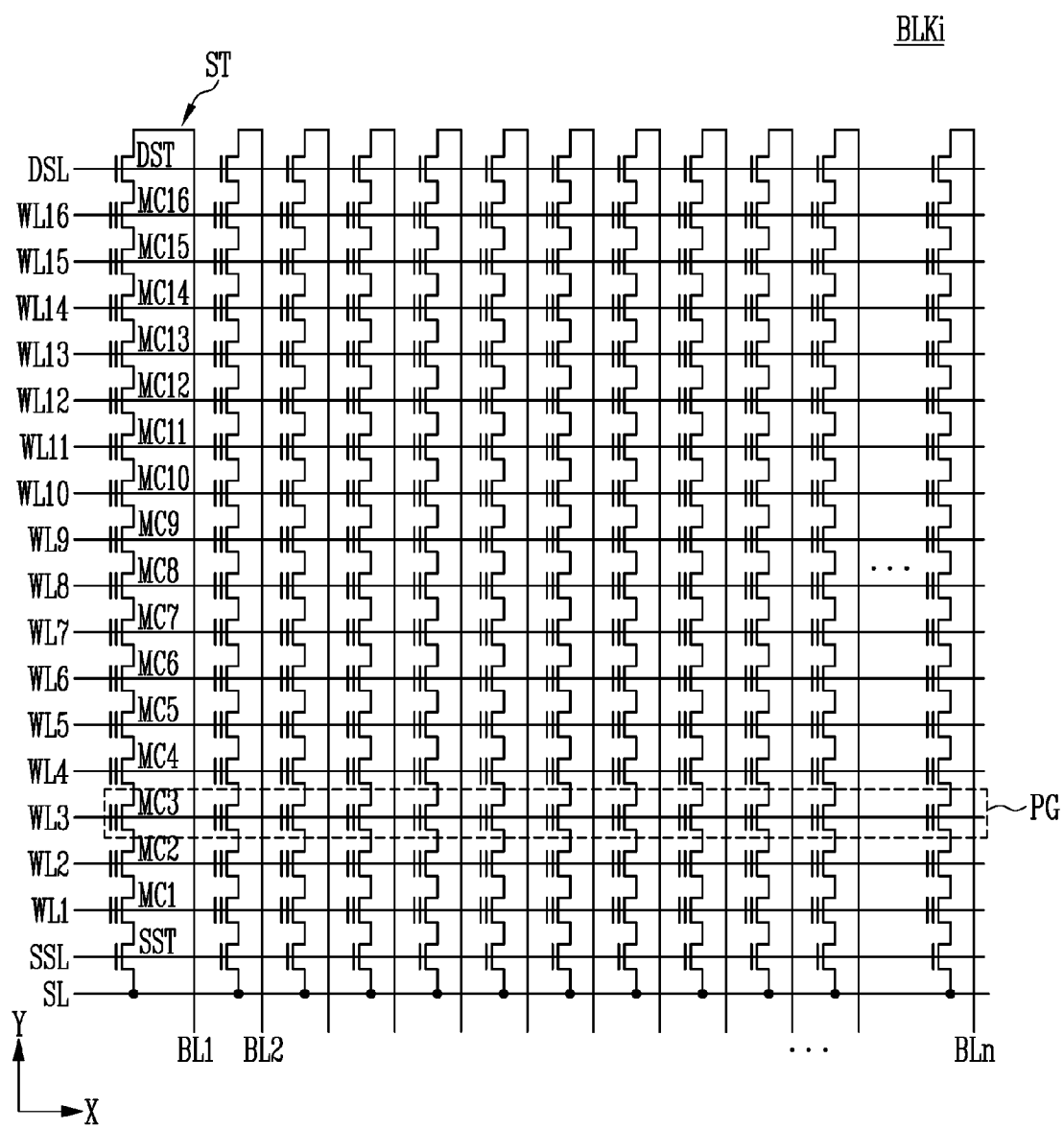
FIG. 3 is a diagram illustrating a structure of any one of memory blocks of FIG. 2.

FIG. 3 is a diagram illustrating a structure of any one of memory blocks of FIG. 2.

FIG. 3 illustrates a structure of a memory block BLKi indicating any of the memory blocks BLK1 to BLKi of FIG. 2.

Referring to FIG. 3, a plurality of word lines arranged in parallel to each other may be coupled between a first select line and a second select line. Here, the first select line may be a source select line SSL, and the second select line may be a drain select line DSL. In detail, the memory block BLKi may include a plurality of strings ST coupled between bit lines BL1 to BLn and a source line SL. The bit lines BL1 to BLn may be coupled to the strings ST, respectively, and the source line SL may be coupled in common to the strings ST. The strings ST may have the same structure, and thus the first string ST coupled to the first bit line BL1 will be described in detail by way of example.

The first string ST may include a source select transistor SST, a plurality of memory cells MC1 to MC16, and a drain select transistor DST, which are coupled in series to each other between the source line SL and the first bit line BL1. A single string ST may include at least one source select transistor SST and at least one drain select transistor DST, and may include more memory cells than the memory cells MC1 to MC16 illustrated in the drawing.

In the first string ST, a source of the source select transistor SST may be coupled to the source line SL, and a drain of the drain select transistor DST may be coupled to the first bit line BL1. The memory cells MC1 to MC16 may be coupled in series between the source select transistor SST and the drain select transistor DST.

Gates of the source select transistors SST included in different strings ST may be coupled to the source select line SSL, gates of the drain select transistors DST included in the different strings ST may be coupled to the drain select line DSL, and gates of the memory cells MC1 to MC16 may be coupled to a plurality of word lines WL1 to WL16, respectively. A group of memory cells coupled to the same word line, among the memory cells included in the different strings ST, may be referred to as a 'physical page (PG)'. Therefore, the memory block BLKi may include a plurality of physical pages (PG) respectively corresponding to the word lines WL1 to WL16.

One memory cell may store one bit of data. This cell is typically designated as a "single-level cell (SLC)". In this case, one physical page (PG) may store data corresponding to one logical page (LPG). The data corresponding to one logical page (LPG) may include a plurality of bits of data that correspond to the number of cells included in the one physical page (PG).

One memory cell may store two or more bits of data. In this case, one physical page (PG) may store data corresponding to two or more logical pages (LPG). The two or more logical pages (LPG) may respectively correspond to the two or more bits of data.

Figure 4:
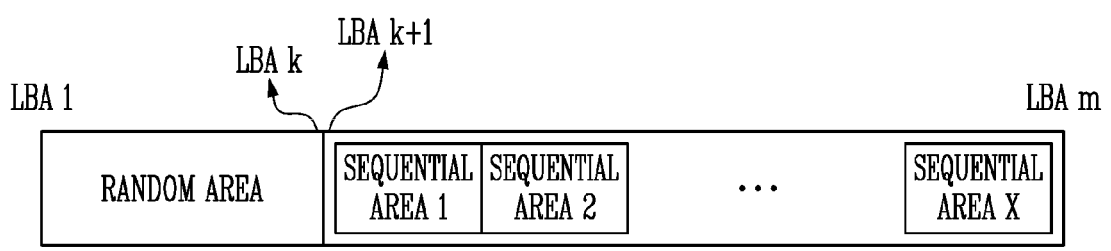
FIG. 4 is a diagram for explaining a storage area of the storage device of FIG. 1 according to an embodiment of the present disclosure.

FIG. 4 is a diagram for explaining a storage area of the storage device 50 of FIG. 1 according to an embodiment of the present disclosure.

Referring to FIG. 4, the storage area of the storage device 50 may be divided into a random area and a plurality of sequential areas.

In FIG. 4, it is assumed that logical addresses to be provided by the host 400, described above with reference to FIG. 1, range from a first logical address LBA 1 to an m-th logical address LBA m.

Pieces of data corresponding to the first logical address LBA 1 to a k-th logical address LBA k may be stored in the random area. The data to be stored in the random area may be provided regardless of a sequence of the logical addresses.

Pieces of data corresponding to a (k+1)-th logical address LBA k+1 to the m-th logical address LBA m may be stored in the sequential areas (i.e., sequential area 1 to sequential area X). The plurality of sequential areas may store pieces of data of logical address groups respectively corresponding thereto. In this case, each of the logical address groups may include consecutive logical addresses. Data to be stored in each sequential area may be provided depending on consecutive logical addresses included in a corresponding logical address group. The storage area may correspond to the memory device 100 of FIG. 1.

Figure 5:
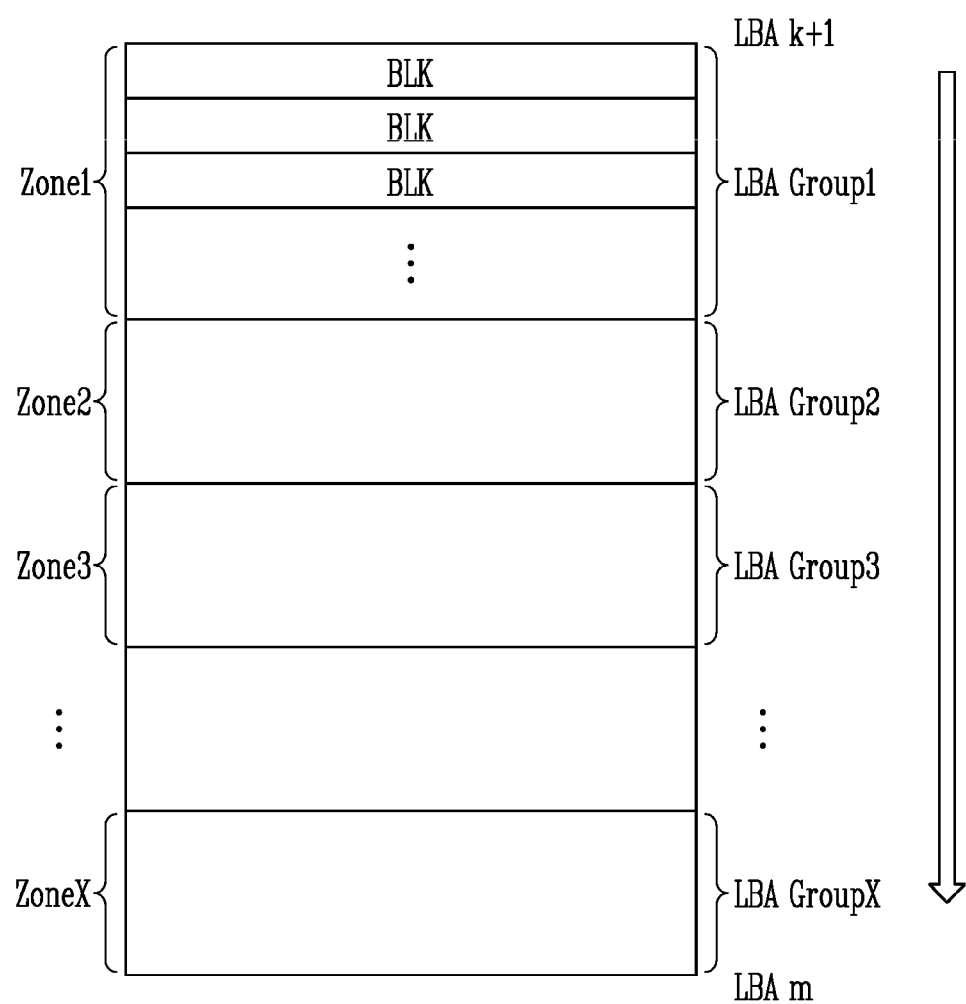
FIG. 5 is a diagram for explaining sequential areas described with reference to FIG. 4.

FIG. 5 is a diagram for explaining the sequential areas described with reference to FIG. 4.

Referring to FIG. 5, the sequential areas may include a first sequential area Zone1 to an X-th sequential area ZoneX. Each sequential area may include a plurality of memory blocks. The numbers of memory blocks allocated to the sequential areas Zone1 to ZoneX may differ from each other. Alternatively, the numbers of memory blocks allocated to the sequential areas Zone1 to ZoneX may be identical to each other. The sequential areas Zone1 to ZoneX may store pieces of data of logical address groups LBA Group1 to LBA GroupX respectively corresponding thereto. In this case, each of the logical address groups LBA Group1 to LBA GroupX may include consecutive logical addresses. Data to be stored in each of the sequential areas Zone1 to ZoneX may be provided depending on consecutive logical addresses included in a corresponding logical address group. Each of the logical address groups LBA Group1 to LBA GroupX includes a plurality of consecutive logic addresses selected from among the (k+1)-th logical address LBA k+1 to the m-th logical address LBA m.

Figure 6:
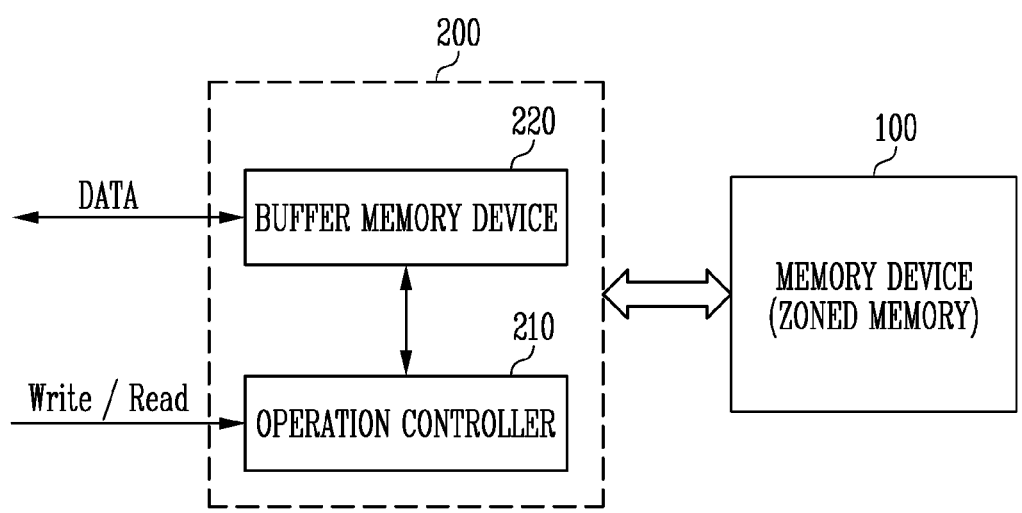
FIG. 6 is a diagram illustrating an operation of the storage device of FIG. 1 according to an embodiment of the present disclosure.

FIG. 6 is a diagram illustrating an operation of the storage device 50 of FIG. 1 according to an embodiment of the present disclosure. The operation of FIG. 6 will be described with the storage device 50 illustrated in FIG. 1.

Referring to FIG. 6, the memory controller 200 may include the buffer memory device 220 and the operation controller 210 as illustrated in FIG. 1.

The operation controller 210 may control the buffer memory device 220 and the memory device 100 (e.g., a zoned memory) so that write data corresponding to a write request provided from the host 400 is stored in the memory device 100. The operation controller 210 may provide the memory device 100 with the write data in the program unit size of the memory device 100. The program unit size may be a size of write data that can be stored in the memory device 100 by performing one program operation.

When a size of write data stored in the buffer memory device 220 is less than the program unit size, the operation controller 210 may not provide the write data to the memory device 100. When a size of write data stored in the buffer memory device 220 reaches the program unit size, the operation controller 210 may provide the write data to the memory device 100.

When the size of the write data stored in the buffer memory device 220 is less than the program unit size of the memory device 100, the operation controller 210 may generate combined data by adding dummy data to the write data, a size of the dummy data corresponding to a difference between the size of the write data and the program unit size. Then, the operation controller 210 may control the buffer memory device 220 and the memory device 100 so that the combined data is stored in the memory device 100.

The operation controller 210 may store information relating to the combined data in the buffer memory device 220, the combined data information indicating that the combined data has been stored in the memory device 100.

The combined data information may include information about logical addresses corresponding to the dummy data contained in the combined data stored in the memory device 100. Alternatively, the combined data information may include information about a sequential area in which the dummy data is stored. In an embodiment, the combined data information may further include information about the size of the dummy data. In this case, the information about the size of the dummy data may be information about a length of the logical addresses corresponding to the dummy data.

After that, the operation controller 210 may receive a subsequent write request. The operation controller 210 may determine, based on the combined data information, whether the combined data has been stored in a sequential area corresponding to the subsequent write request. When the combined data is stored in the sequential area corresponding to a logical address included in the subsequent write request, the operation controller 210 may control the memory device 100 so that a part of subsequent write data corresponding to the subsequent write request is stored in the random area of the memory device 100.

In detail, the operation controller 210 may control the memory device 100 so that sub-data, which is the part of the subsequent write data, is stored in the random area and residual data other than the sub-data is stored in the sequential area in succession to the combined data. The sub-data has a size corresponding to the size of the dummy data contained in the combined data. Logical addresses corresponding to the sub-data and logical addresses corresponding to the dummy data may be identical to each other. In an embodiment, the logical addresses of the residual data may be consecutive to the last logical address among the logical addresses corresponding to the combined data.

The buffer memory device 220 may store a sequential mapping table including information about logical addresses of pieces of data stored in the respective sequential areas, and write pointer position information including information about logical addresses of pieces of data to be stored in the respective sequential areas. Here, the write pointer position information may be information about a start logical address of data to be subsequently stored. The buffer memory device 220 may further store a random mapping table including information about logical addresses of data stored in the random area.

After that, the operation controller 210 may receive a read request from the host 400. The operation controller 210 may primarily determine whether a logical address included in the read request is identical to any logical address contained in the combined data information. When any logical address corresponding to data to be read is present in the combined data information, the data corresponding to the logical address may be stored in the random area, whereas when any logical address corresponding to the data to be read is not present in the combined data information, the data corresponding to the logical address may be stored in a sequential area.

Figure 7:
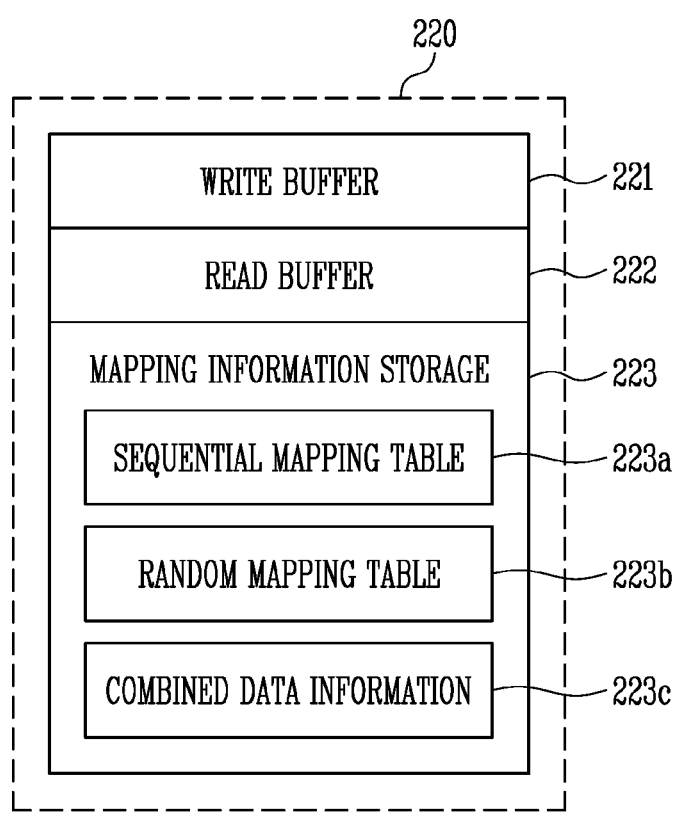
FIG. 7 is a diagram illustrating a structure of a buffer memory device of FIG. 6.

FIG. 7 is a diagram illustrating a structure of the buffer memory device 220 of FIG. 6 according to an embodiment.

Referring to FIGS. 6 and 7, the buffer memory device 220 may include a write buffer 221, a read buffer 222, and a mapping information storage 223.

The write buffer 221 may temporarily store data to be stored in the memory device 100.

In an embodiment, the write buffer 221 may include sequential buffers which temporarily store pieces of data to be respectively stored in a plurality of sequential areas included in the memory device 100. Alternatively, the write buffer 221 may include a random buffer which temporarily stores data to be stored in a random area included in the memory device 100.

The read buffer 222 may temporarily store data read from the memory device 100 before providing the data to the host 400.

The mapping information storage 223 may store a sequential mapping table 223a, a random mapping table 223b, and combined data information 223c.

The sequential mapping table 223a may include mapping information between logical addresses and physical addresses of pieces of data stored in the respective sequential areas in the memory device 100, and write pointer position information including information about logical addresses of pieces of data to be stored in the respective sequential areas.

The random mapping table 223b may include mapping information between logical addresses and physical addresses of data stored in the random area in the memory device 100.

The combined data information 223c may include information about a sequential area in which combined data including dummy data is stored, among the sequential areas, and information about logical addresses of the dummy data stored in the sequential area. Here, the information about the logical addresses of the dummy data may include information about a start logical address among the logical addresses of the dummy data and a length of the logical addresses corresponding to the dummy data. In an embodiment, the combined data information 223c may further include information about a size of the dummy data.

FIGS. 8A to 8D illustrate an operation of storing write data having a size less than a program unit size. The operation illustrated in FIGS. 8A to 8D will be described with reference to the buffer memory device 220 shown in FIG. 7.

FIG. 8A illustrates a state in which the write data having the size less than the program unit size is temporarily stored in the write buffer 221 of the buffer memory device 220. Thereafter, a flush request may be input from the host 400.

FIG. 8B illustrates a state in which combined data is generated by adding dummy data, corresponding to a difference between the program unit size and the size of the write data, to the write data. FIG. 8C shows a state in which the combined data is stored in a first sequential area Zone 1 of the memory device 100 during a program operation.

FIG. 8D illustrates a position of a write pointer after the combined data has been stored in the first sequential area Zone1 of the memory device 100. After the write data has been stored in the first sequential area Zone 1, the host 400 may recognize the write pointer as a p-th logical address LBA p. However, since the dummy data is added in order for the storage device 50 to store data corresponding to the program unit size, the actual position of the write pointer may indicate a q-th logical address LBA q after the combined data has been stored.

Figure 9B:
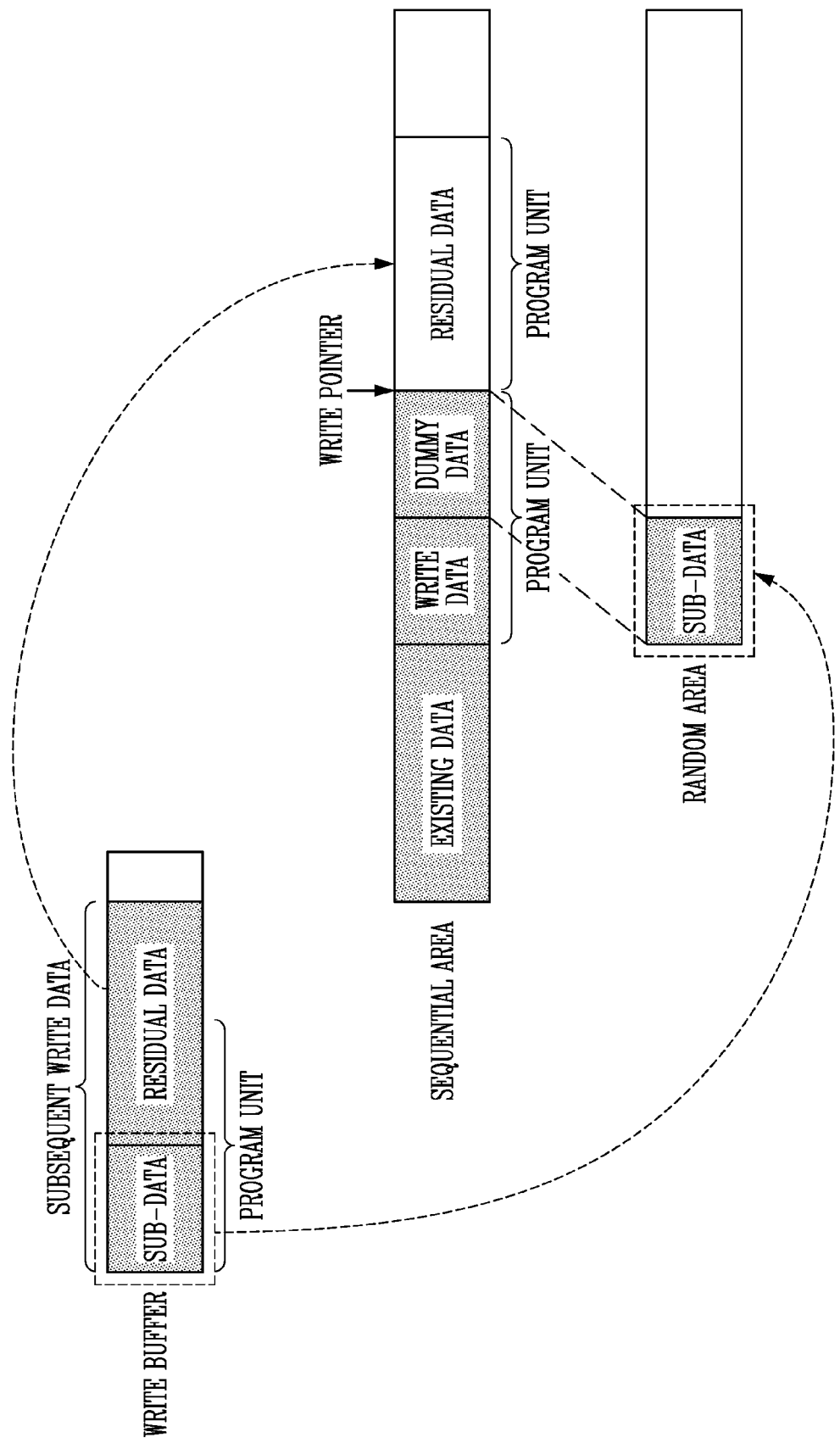

FIGS. 9A and 9B are diagrams illustrating an operation of the storage device 50 of FIG. 1 according to an embodiment of the present disclosure.

FIG. 9A illustrates a state in which dummy data is added to write data to generate combined data and the combined data is stored in a sequential area of the memory device 100 so as to store the write data having a size less than a program unit size in the sequential area.

FIG. 9B illustrates a method of storing subsequent write data.

Referring to FIGS. 9A and 9B, the memory controller 200 may store a part of the subsequent write data in a random area of the memory device 100 and store the remaining data of the subsequent write data in a sequential area. In detail, the memory controller 200 may control the memory device 100 so that sub-data of the subsequent write data that is the part of the subsequent write data is stored in the random area and residual data of the subsequent write data that is the remaining data is stored in the sequential area in succession to the dummy data. The sub-data has the same size as the dummy data included in the combined data. In this embodiment, the residual data may have a size equal to the program unit size.

Figure 10:
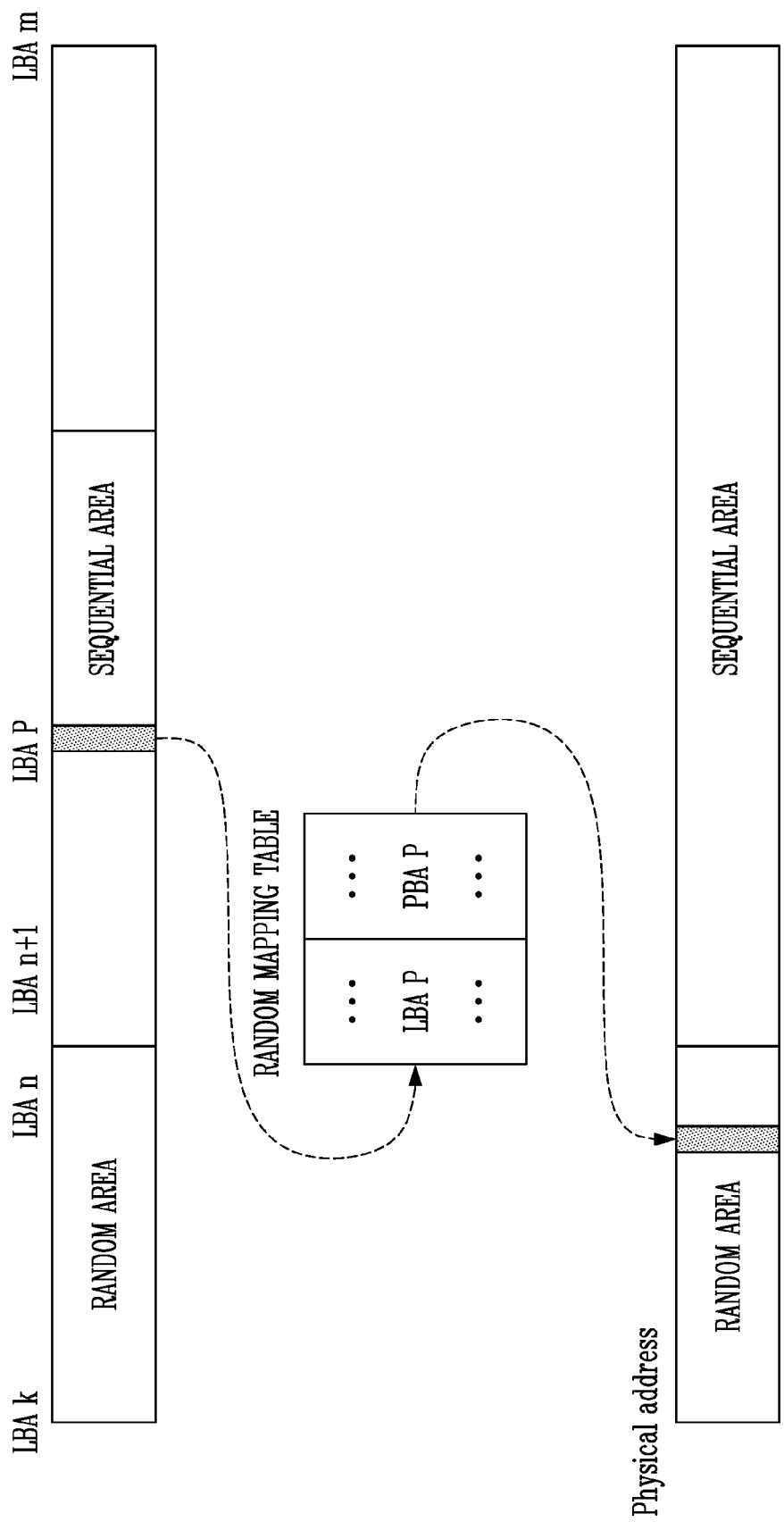
FIG. 10 is a diagram for explaining mapping information of dummy data stored in a sequential area.

FIG. 10 is a diagram for explaining mapping information of dummy data stored in a sequential area.

Referring to FIG. 10, a random area may be an area which stores data corresponding to a k-th logical address LBA k to an n-th logical address LBA n, and sequential areas may be areas which store data corresponding to an (n+1)-th logical address LBA n+1 to an m-th logical address LBA m.

In FIG. 10, it is assumed that combined data is stored in a sequential area and that a logical address of dummy data contained in the stored combined data is a p-th logical address LBA P. Therefore, among subsequent write data that is subsequently input to follow write data contained in the combined data, sub-data of the subsequent write data that is data corresponding to a size of the dummy data may be stored in the random area.

Since the host 400 may recognize a logical address of the sub-data stored in the random area as the P-th logical address LBA P, the logical address of the sub-data in a random mapping table may be the P-th logical address LBA P. Also, a physical address corresponding to the P-th logical address LBA P may be a P-th physical address PBA P, which is a physical address of the sub-data stored in the random area, rather than a physical address of the dummy data stored in the sequential area.

Figure 11:
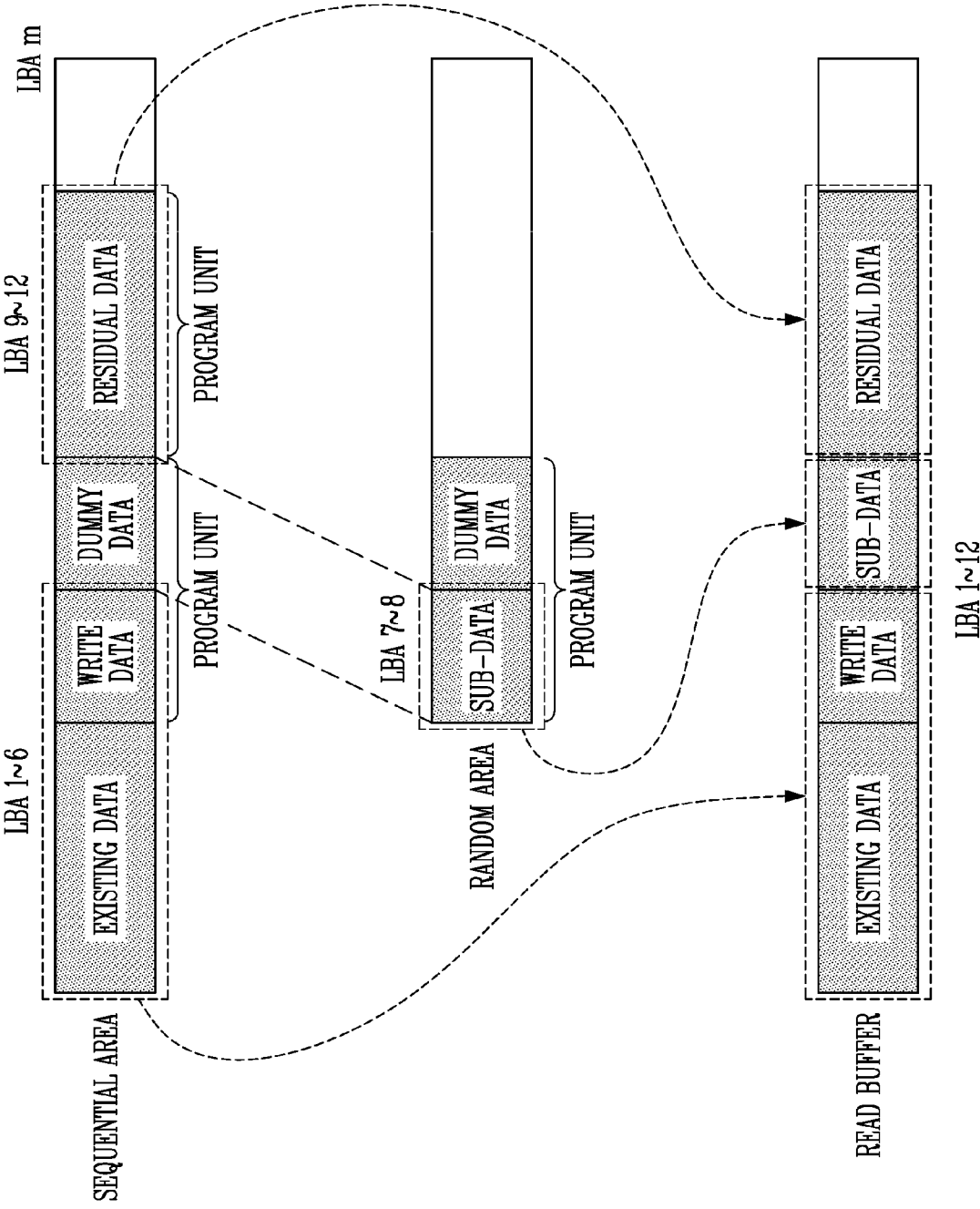
FIG. 11 is a diagram illustrating a procedure for processing a read request for data.

FIG. 11 is a diagram illustrating a procedure for processing a read request for stored data described with reference to FIGS. 9A and 9B.

In FIG. 11, it is assumed that sequential read requests for first to twelfth logical addresses LBA 1 to LBA 12 are received from the host 400.

Logical addresses of existing data and previous write data, stored in sequential areas, range from the first to sixth logical addresses LBA 1 to LBA 6, and logical addresses of dummy data of combined data including the previous write data and sub-data of subsequent write data stored in a random area range from the seventh to eighth logical addresses LBA 7 to LBA 8. Further, logical addresses of residual data of the subsequent write data that is stored in the sequential areas range from the ninth to twelfth logical addresses LBA 9 to LBA 12.

The memory device 100 may recognize, based on combined data information for the combined data, that the logical addresses of the dummy data range from the seventh to eighth logical addresses LBA 7 to LBA 8 and that pieces of data corresponding to the logical addresses LBA 7 to LBA 8 are stored in the random area. Therefore, when temporarily storing pieces of data for the first to twelfth logical addresses LBA 1 to LBA 12 in the read buffer 222 of the buffer memory device 220 so as to provide the pieces of data to the host 400 in response to the read requests, the memory device 100 may read pieces of data corresponding to the first to sixth logical addresses LBA 1 to LBA 6 from the sequential areas, read data corresponding to the seventh to eighth logical addresses LBA 7 to LBA 8 from the random area, and read again data corresponding to the ninth to twelfth logical addresses LBA 9 to LBA 12 from the sequential areas.

Figures 12C, 13:
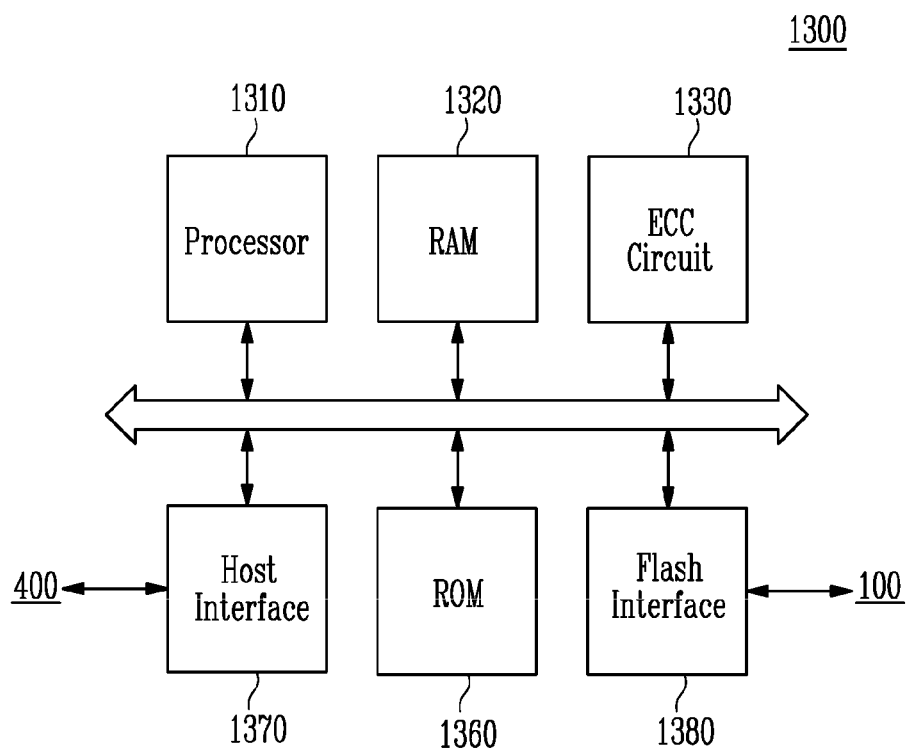

FIGS. 12A to 12C are diagrams for explaining data stored in the mapping information storage 223 of FIG. 7.

FIG. 12A illustrates an embodiment of the sequential mapping table 223a described above with reference to FIG. 7.

The sequential mapping table 223a may include mapping information for the sequential areas of the memory device 100, e.g., information about consecutive logical addresses and information about physical addresses corresponding to the consecutive logical addresses. FIG. 12A illustrates a state of mapping between the consecutive logical addresses and the physical addresses. However, embodiments are not limited thereto. In another embodiment, the sequential mapping table 223a may store information about the consecutive logical addresses and the physical addresses corresponding thereto using a start logical address among the consecutive logical addresses and a length of logical addresses for each program unit.

In an embodiment, the sequential mapping table 223a may further include write pointer position information indicating a logical address of data to be stored in each sequential area.

FIG. 12B illustrates an embodiment of the random mapping table 223b described above with reference to FIG. 7.

Referring to FIG. 12B, the random mapping table 223b may store mapping information between logical addresses and physical addresses of data stored in the random area of the memory device 100.

FIG. 12C illustrates an embodiment of the combined data information 223c described above with reference to FIG. 7.

Referring to FIG. 12C, the combined data information 223c may include information about a sequential area Zone #, in which combined data is stored, among the sequential areas of the memory device 100, and information about logical addresses of dummy data stored in the sequential area Zone #. Here, the information about the logical addresses of the dummy data may include information about a start logical address of the dummy data and a length of the logical addresses corresponding to the dummy data. In an embodiment, the combined data information 223c may further include information about a size of the dummy data. Referring to FIG. 12C, the length of the logical addresses corresponding to the dummy data may correspond to the size of the dummy data.

FIG. 13 is a diagram illustrating a memory controller 1300 according to an embodiment. The memory controller 1300 illustrated in FIG. 13 may correspond to the memory controller 200 shown in FIG. 1.

Referring to FIG. 13, the memory controller 1300 may include a processor 1310, a RAM 1320, an error correction code (ECC) circuit 1330, a ROM 1360, a host interface 1370, and a flash interface 1380.

The processor 1310 may control the overall operation of the memory controller 1300. The RAM 1320 may be used as a buffer memory, a cache memory, or a working memory of the memory controller 1300.

The ROM 1360 may store various types of information required for the operation of the memory controller 1300 in the form of firmware.

The memory controller 1300 may communicate with an external device (e.g., the host 400 of FIG. 1, an application processor, or the like) through the host interface 1370.

The memory controller 1300 may communicate with the memory device 100 of FIG. 1 through the flash interface 1380. The memory controller 1300 may transmit a command CMD, an address ADDR, a control signal CTRL, etc. to the memory device 100 and receive data DATA from the memory device 100, through the flash interface 1380. In an example, the flash interface 1380 may include a NAND interface.

Figure 14:
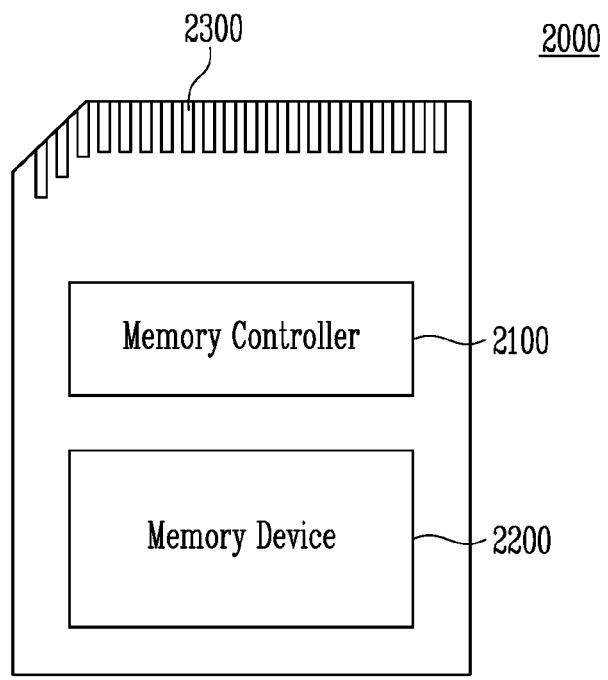
FIG. 14 is a block diagram illustrating a memory card system to which the storage device according to the embodiment of the present disclosure is applied.

FIG. 14 is a block diagram illustrating a memory card system 2000 to which a storage device according to an embodiment of the present disclosure is applied.

Referring to FIG. 14, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200, described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Transfer Torque magnetic RAM (STT-MRAM), or the like.

The memory controller 2100 and the memory device 2200 may be integrated into a single semiconductor device to configure a memory card such as a PC card (personal computer memory card international association: PCM-CIA), a compact flash card (CF), a smart media card (SM or SMC), a memory stick, a multimedia card (MMC, RS-MMC, MMCmicro, or eMMC), a SD card (SD, miniSD, microSD, or SDHC), or a universal flash storage (UFS).

Figure 15:
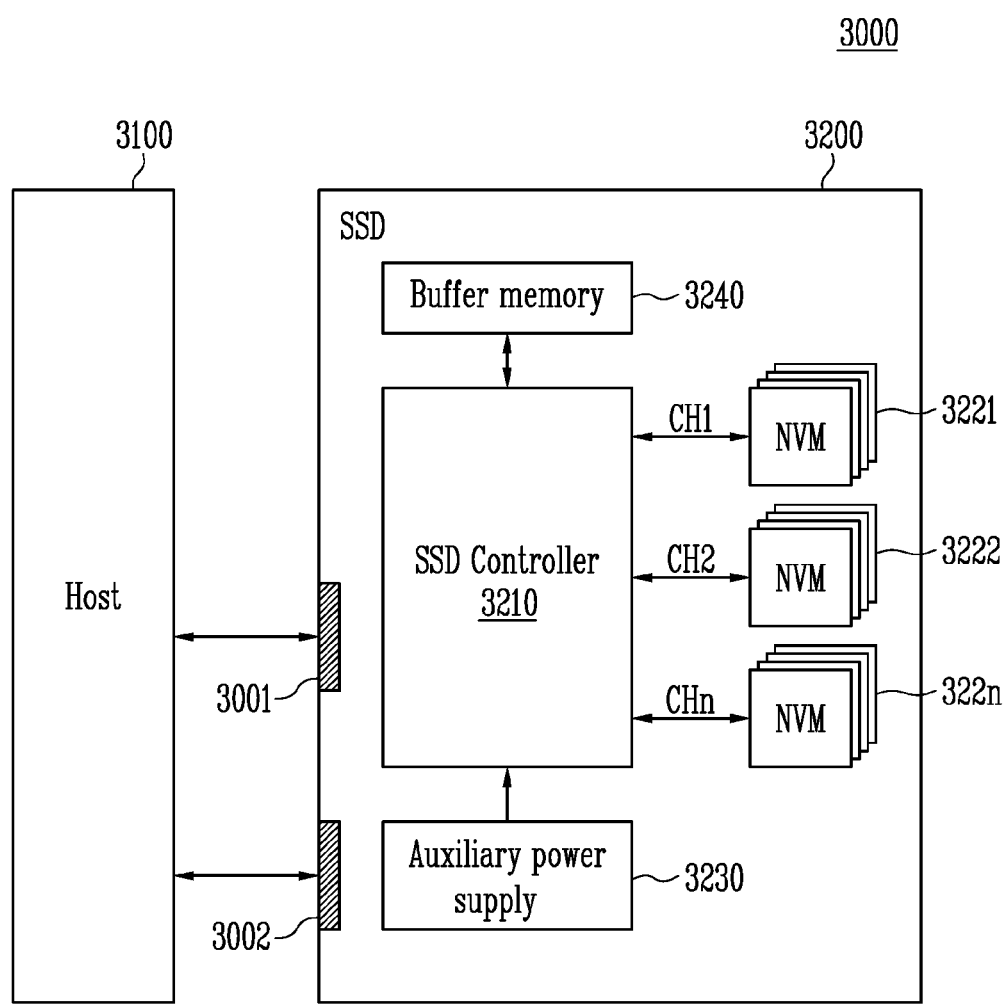
FIG. 15 is a block diagram illustrating a solid state drive (SSD) system to which the storage device according to the embodiment of the present disclosure is applied.

FIG. 15 is a block diagram illustrating a solid state drive (SSD) system 3000 to which a storage device according to an embodiment of the present disclosure is applied.

Referring to FIG. 15, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 16:
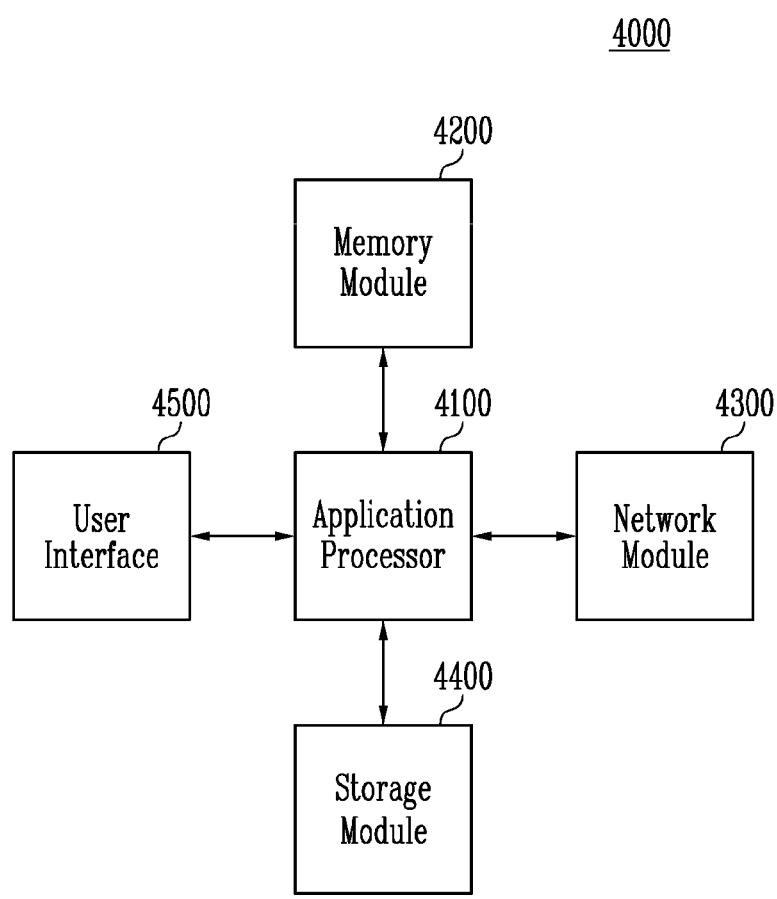
FIG. 16 is a block diagram illustrating a user system to which the storage device according to the embodiment of the present disclosure is applied.

FIG. 16 is a block diagram illustrating a user system 4000 to which a storage device according to an embodiment of the present disclosure is applied.

Referring to FIG. 16, the user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may operate in the same way as the memory device 100 described above with reference to FIG. 1. The storage module 4400 may operate in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a storage device having improved storage performance and a method of operating the storage device.

What is claimed is:

1. A storage device, comprising:
    a memory device including a plurality of sequential areas and a random area other than the plurality of sequential areas, the plurality of sequential areas storing pieces of data corresponding to consecutive logical addresses input from a host;
    a buffer memory device configured to temporarily store write data corresponding to a write request provided from the host; and
    an operation controller configured to generate combined data by adding dummy data to the write data when a size of the write data is less than a program unit size of the memory device, a size of the dummy data corresponding to a difference between the size of the write data and the program unit size, store the combined data in a sequential area that is determined based on the write request among the plurality of sequential areas, and store combined data information, relating to the combined data stored in the sequential area, in the buffer memory device,
    wherein the operation controller stores sub-data of subsequent write data in the random area in response to the combined data information indicating that the combined data including the dummy data is stored in the sequential area,
    wherein the subsequent write data corresponds to a subsequent write request input from the host after the combined data has been stored in the sequential area, and
    wherein a size of the sub-data corresponds to the size of the dummy data.

2. The storage device according to claim 1, wherein:
    the plurality of sequential areas are storage areas in which pieces of data respectively corresponding to logical address groups are stored, and
    each of the logical address groups includes consecutive logical addresses.

3. The storage device according to claim 1, wherein the buffer memory device further stores:
    a sequential mapping table including information about logical addresses of pieces of data respectively stored in the plurality of sequential areas and write pointer position information indicating position information about a start logical address among the logical addresses of each of the pieces of data to be respectively stored in the plurality of sequential areas; and
    a random mapping table including information about a logical address of data stored in the random area.

4. The storage device according to claim 3, wherein the operation controller stores the combined data based on write pointer position information of the sequential area corresponding to a logical address in the write request.

5. The storage device according to claim 4, wherein a logical address corresponding to the write pointer position information of the sequential area corresponding to the logical address in the write request and a logical address of the combined data are consecutive addresses.

6. The storage device according to claim 2, wherein the combined data information includes information about logical addresses corresponding to the dummy data among logical addresses included in a logical address group of a sequential area, the sequential area corresponding to a logical address in the write request among the plurality of sequential areas, and information about the sequential area in which the dummy data is stored.

7. The storage device according to claim 6, wherein the combined data information further includes information about the size of the dummy data.

8. The storage device according to claim 2, wherein:
    the buffer memory device temporarily stores the subsequent write data.

9. The storage device according to claim 8, wherein the operation controller controls the buffer memory device and the memory device so that residual data of the subsequent write data is stored in a sequential area, corresponding to a logical address in the subsequent write request, among the plurality of sequential areas, the residual data being remaining data other than the sub-data.

10. The storage device according to claim 9, wherein a logical address of the residual data is consecutive to a last logical address among logical addresses of the combined data.

11. The storage device according to claim 8, wherein the operation controller stores information about a logical address and a physical address of the sub-data in a random mapping table including information about a logical address of data stored in the random area.

12. A storage device, comprising:
    a memory device including a plurality of sequential areas and a random area other than the plurality of sequential areas, the plurality of sequential areas storing pieces of data corresponding to consecutive logical addresses input from a host; and
    a memory controller configured to receive a write request from the host and control the memory device so that sub-data of write data corresponding to the write request is stored in the random area when dummy data has been stored in a sequential area among the plurality of sequential areas, wherein the sequential area corresponds to a logical address included in the write request, and wherein a size of the sub-data corresponds to a size of the dummy data.

13. The storage device according to claim 12, wherein:

the plurality of sequential areas are storage areas in which pieces of data respectively corresponding to logical address groups are stored, and each of the logical address groups includes consecutive logical addresses.

14. The storage device according to claim 12, wherein the memory controller comprises a buffer memory device configured to store:

a sequential mapping table including information about logical addresses of pieces of data respectively stored in the plurality of sequential areas and write pointer position information indicating position information about a start logical address among logical addresses of each of the pieces of data to be respectively stored in the plurality of sequential areas, a random mapping table including information about a logical address of data stored in the random area, and combined data information including information about dummy data stored in the plurality of sequential areas.

15. The storage device according to claim 14, wherein the memory controller is configured to, when the dummy data is stored in a sequential area corresponding to a logical address included in the write request, control the buffer memory device and the memory device so that the sub-data of the write data is stored in the random area, the size of the sub-data corresponding to the size of the dummy data.

16. The storage device according to claim 15, wherein the memory controller controls the buffer memory device and the memory device so that residual data of the write data is stored in a sequential area corresponding to a logical address included in the write request, the residual data being remaining data other than the sub-data.

17. The storage device according to claim 16, wherein a logical address of the residual data is consecutive to a last logical address among logical addresses of the dummy data.

18. The storage device according to claim 16, wherein the memory controller stores information about a logical address and a physical address of the sub-data in the random mapping table, and wherein a logical address of the sub-data is an address identical to a logical address of the dummy data.

19. The storage device according to claim 14, wherein:

the plurality of sequential areas are storage areas in which pieces of data respectively corresponding to logical address groups are stored, each of the logical address groups includes consecutive logical addresses, and the combined data information includes information about logical addresses corresponding to the dummy data among logical addresses included in a logical address group of a sequential area, the sequential area corresponding to the logical address in the write request among the plurality of sequential areas, and information about the sequential area in which the dummy data is stored.

20. A storage device, comprising:

a memory device including a plurality of sequential areas and a random area other than the plurality of sequential areas, the plurality of sequential areas storing pieces of data corresponding to consecutive logical addresses input from a host;

a buffer memory device configured to store a sequential mapping table including information about logical addresses of the pieces of data respectively stored in the plurality of sequential areas, a random mapping table including information about a logical address of data stored in the random area, and combined data information including information about dummy data stored in the plurality of sequential areas; and a memory controller configured to:

acquire read data from the random area and the plurality of sequential areas when a logical address included in a read request input from the host is included in the combined data information, and provide the read data corresponding to the read request to the host, wherein logical addresses of the read data are consecutive, and wherein the memory controller acquires some of the read data that correspond to logical addresses of the dummy data from the random area and some other of the read data that correspond to the logical address included in the read request from a sequential area among the plurality of sequential areas.

* * * * *